United States Patent Office 3,613,159
Patented Oct. 19, 1971

3,613,159
APPARATUS FOR COATING EXTRUDED PLASTIC TUBES WITH FINELY DIVIDED SILICA OR SILICATES
Hanns Biegler, Wesseling, Germany, assignor to Deutsche Gold- und Silber-Scheideanstalt vormals Roessler, Frankfurt am Main, Germany
Original application July 2, 1968, Ser. No. 741,942. Divided and this application Feb. 3, 1970, Ser. No. 8,186
Claims priority, application Germany, July 5, 1967, D 53,530
Int. Cl. B05b 13/00
U.S. Cl. 18—14 A
4 Claims

ABSTRACT OF THE DISCLOSURE

Extruded plastic tubes are coated with finely divided silica or silicates by contacting such tubes shortly after extrusion while they are still warm and soft with a turbulent suspension of the finely divided silica or silicates in air which have assumed a negative electrostatic charge whereby the silica or silicates are deposited as a thin coating on the oppositely charged extruded tube. The apparatus for such coating process comprises an extruder, an annular chamber adapted to surround the extruded tubes, means for introducing finely divided silica or silicates turbulently suspended in air into such chamber to contact and coat such extruded tubes and means for withdrawing excess suspended silica or silicates from such chamber and recycling it back to the chamber.

CROSS REFERENCE TO RELATED APPLICATION

The present application is a division of my copending application Ser. No. 741,942, filed July 2, 1968, now abandoned.

BACKGROUND OF THE INVENTION

The reduction of the sliding or slipping properties of packaging materials of all types presents a problem in the industry concerned, the solution of which is of increasing importance, particularly to prevention of accidents.

Package material of paper, for example, paper sacks or box wrappings, can, as is known, be coated with a thin layer of finely divided silica by application of aqueous suspensions or dispersions of such silica to provide anti-slip properties. Sacks with good anti-slip properties render it possible to ship and store goods stacked in such sacks without danger of slippage and at the same time facilitate the manual handling of the sacked goods and reduce the danger of accidents.

Extremely finely divided silica has also been added to the plasticizer solutions used for the treatment of cellulose hydrate films to reduce their tendency to blocking when rolled and render it possible to unroll them without difficulty.

However, the silica dispersion technique of the known type could not for technical reasons be applied to plastic or synthetic resin packaging material such as, for example, sacks produced from polyethylene or polyvinyl chloride tubes.

DESCRIPTION OF THE INVENTION INCLUDING PREFERRED EMBODIMENTS

It is an object of the invention to provide an apparatus for coating extruded synthetic thermoplastic resin or plastic tubes with finely divided silica or silicates which renders it possible to apply a thin coating of such silica or silicates in a simple operation.

The essence of the invention resides in that the finely divided silica or silicate is turbulently suspended with the aid of a blast air stream in a turbulent zone arranged adjacent to the plastic tube shortly after it leaves the extruder and the particles are allowed to be electrostatically charged by collisions with each other and frictional conditions while they are conveyed and is then firmly deposited from the turbulent zone on the adjacent oppositely charged extruded plastic tube while it is still warm and soft. The electrostatic charge on the extruded plastic tube is caused by the frictional conditions occurring as the tube is extruded from the metallic nozzle head.

It was found that finely divided silica when turbulently suspended in air becomes electrostatically charged as a result of the collisions between the silica particles and the frictional conditions occurring while they are conveyed and they can be deposited on the oppositely charged plastic tube, such as a polyethylene tube. When such deposit is effected when the extruded tube is still warm and soft, for example, shortly after it leaves the extruder, it then adheres sufficiently firmly to the tube when it cools and hardens. This effect is superimposed and also strengthened by the mechanics of the turbulent suspension.

Synthetic and naturally occurring finely divided silicates and/or silica of a particle size range of 5 m$\mu$ to 60$\mu$ and a specific BET surface area of 2 to 500 m.$^2$/g. and, preferably, pyrogenic or wet precipitated silica of a BET surface area between 80 and 350 m.$^2$/g. are especially suited for producing the coatings according to the invention.

The accompanying drawing schematically shows an advantageous embodiment of an apparatus adapted for carrying out the process according to the invention.

Referring to such drawing, extruder 1 serves to extrude plastic tube 2, annular nozzle 3 serves for introduction of the silica or silicate suspended in air into turbulent zone 4 where the suspended electrostatically charged silica is contacted with the extruded oppositely charged plastic tube while it is still warm and soft. Annular nozzle 5 serves for withdrawing the excess silica which is not deposited on the extruded tube. Blower 6 is provided in metal conduit 7 which serves for conveying and electrostatically charging of the silica in air. Vessel 8 serves to hold the silica which is supplied through metering device 11 to conduit 7 to replace that deposited on the plastic tube. Valves 9 and 10 are provided for regulating the pressure within conduit 7 and the quantity of air containing the silica which is recycled. A breather filter 12 is also provided in conduit 7.

Annular nozzle 3 which serves for introducing the silica suspended in air into turbulent zone 4 is preferably provided with a large number of supply capillaries distributed over its entire circumference in order to provide for better distribution of the silica. The individual capillaries open up in the form of a bundle into conduit 7 ahead of (downstream from) valve 10. The total cross-section of the capillaries at least being equal that of conduit 7. The concentration of the silica suspended in the air in turbulent zone 4 is maintained substantially constant by the addition of further silica through metering device 11 to the air recycled through conduit 7 to compensate for that deposited on the plastic tube. The silica concentration in the turbulent zone should be maintained at least 5 times as high as the effective consumption of silica per unit of time in order to be certain that an adequate supply of silica for deposit on the surface of the tube passing the turbulent zone is always provided. A constant flow of silica suspended in air is constantly provided in turbulent zone 4 which with the aid of annular nozzle 5, conduit 7, blower 6 and annular nozzle 3. The connection of annular nozzle 5 to conduit 7 is of the same type as described with reference to annular nozzle 3.

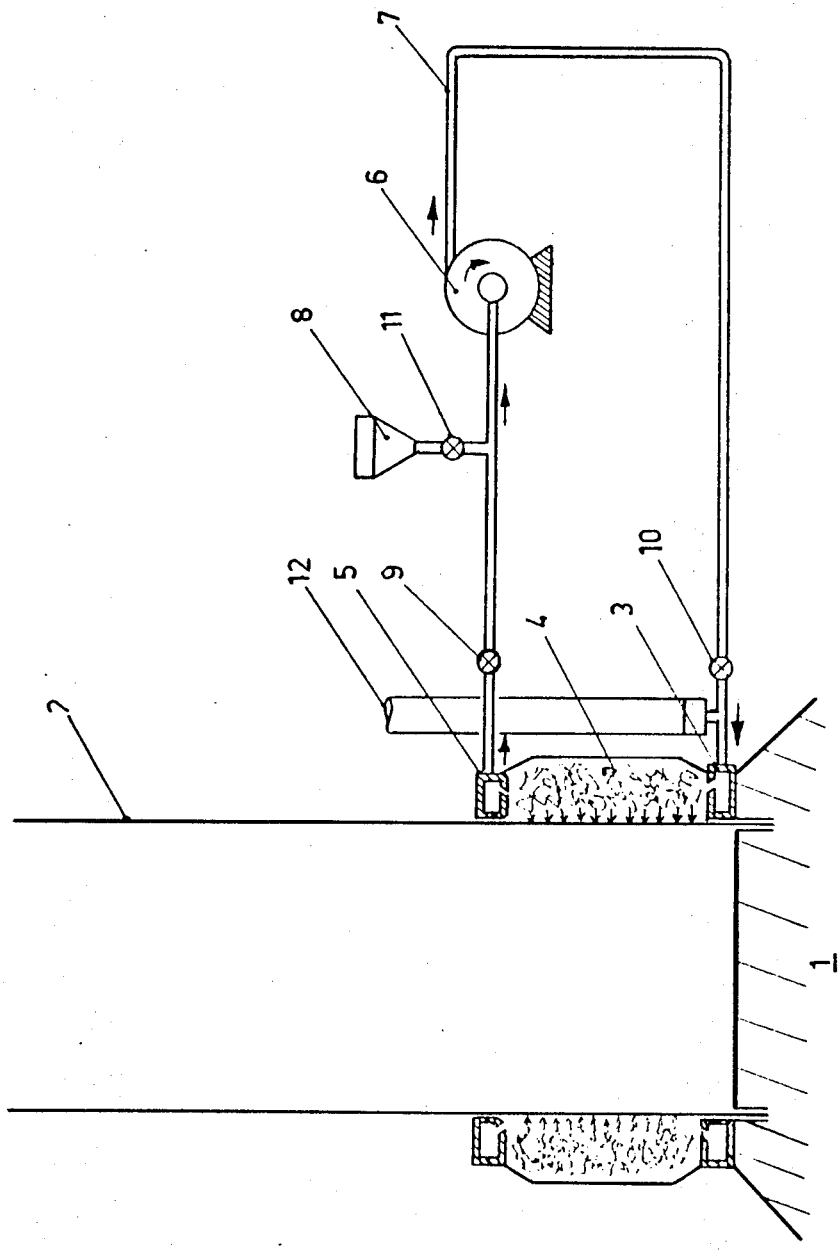

The described arrangement, in addition to providing for a constant excess of silica in turbulent zone 4 for deposit